(12) United States Patent
Kurosawa

(10) Patent No.: US 11,598,721 B2
(45) Date of Patent: Mar. 7, 2023

(54) DROPLET SENSOR

(71) Applicant: Hideo Kurosawa, Kanagawa (JP)

(72) Inventor: Hideo Kurosawa, Kanagawa (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 280 days.

(21) Appl. No.: 17/029,489

(22) Filed: Sep. 23, 2020

(65) Prior Publication Data

US 2021/0096069 A1  Apr. 1, 2021

(30) Foreign Application Priority Data

Sep. 30, 2019 (JP) .............................. JP2019-178497

(51) Int. Cl.
  *G01N 21/552* (2014.01)
  *G01N 21/41* (2006.01)
  *G02B 19/00* (2006.01)

(52) U.S. Cl.
  CPC .......... *G01N 21/41* (2013.01); *G02B 19/0028* (2013.01); *G02B 19/0085* (2013.01); *G01N 2201/0637* (2013.01)

(58) Field of Classification Search
  CPC ...... G01N 21/41; G01N 21/552; G01N 21/01; G01N 21/43; G01N 21/17; G01N 21/3554; G01N 2201/0637; G01N 2021/435; G01N 27/048; G01N 27/223; G01N 33/246; G02B 19/0028; G02B 19/0085; G01W 1/14; B60S 1/0833
  USPC .......................... 356/432–440, 335–343, 73; 250/573–574, 564, 227.25
  See application file for complete search history.

(56) References Cited

U.S. PATENT DOCUMENTS

| | | | | |
|---|---|---|---|---|
| 4,274,705 | A * | 6/1981 | Miller | G01F 23/2927 385/12 |
| 7,482,612 | B2 * | 1/2009 | Zimmerman | A01G 25/167 250/573 |
| 10,955,339 | B2 * | 3/2021 | Kawasaki | G01J 3/021 |
| 11,300,506 | B2 * | 4/2022 | Kawasaki | G01N 21/552 |
| 11,486,827 | B2 * | 11/2022 | Kurosawa | G01N 21/552 |
| 2006/0043270 | A1 * | 3/2006 | Zimmerman | G01N 21/552 250/227.25 |

FOREIGN PATENT DOCUMENTS

| | | |
|---|---|---|
| JP | 2014-211358 | 11/2014 |
| JP | 2014-238383 | 12/2014 |
| JP | 2019-120567 | 7/2019 |

* cited by examiner

*Primary Examiner* — Hoa Q Pham
(74) *Attorney, Agent, or Firm* — IPUSA, PLLC

(57) ABSTRACT

A droplet sensor includes: an optical cover having an ellipsoid surface that is a portion of a spheroid; a light source disposed at or in proximity to a first focal point of the ellipsoid surface; and a light detector disposed at or in proximity to a second focal point of the ellipsoid surface, wherein the ellipsoid surface is an effective detection area configured to reflect light emitted from the light source toward the light detector, and an amount of light reflected by the effective detection area changes in accordance with adhesion of droplets on the ellipsoid surface, and wherein the optical cover has a curved surface that is tangentially connected to an outside of the effective detection area and having a curvature greater than a curvature of the ellipsoid surface.

13 Claims, 11 Drawing Sheets

DROPLET SENSOR

CROSS-REFERENCE TO RELATED APPLICATION

The present application is based on and claims priority to Japanese Application No. 2319-178497 filed on Sep. 30, 2019, the entire contents of which are hereby incorporated by reference.

BACKGROUND OF THE INVENTION

1. Field of the Invention

The present invention relates to a droplet sensor that senses a droplet, such as a raindrop or a waterdrop.

2. Description of the Related Art

An apparatus for detecting raindrops by using a change in reflectance when raindrops adhere to a raindrop detection area of a transparent plate is known (see, for example, Patent Documents 1 and 2). In the apparatus, light emitted from a light emitting element is reflected by a surface of the transparent plate and is received by a light receiver. When raindrops adhere to the rain droplet detection area, the reflectance changes at an interface the transparent plate, the amount of received light changes, and the presence of the raindrops is detected.

RELATED-ART DOCUMENTS

Patent Documents

Patent Document 1: Japanese Patent No. 6094354
Patent Document 2: Japanese Patent No. 6167799

There is a problem in that it difficult to manufacture optical elements used in the apparatuses described in Patent Documents 1 and 2 because of the complexity of the shape of the optical elements.

The present applicant proposes a novel droplet sensor having a simple configuration and that is easily manufactured (Japanese Laid-open Patent Publication No. 2019-120567). The droplet sensor includes, for example, an optical cover having a shape obtained by cutting a spheroid with a plane including a major axis of the spheroid, a light source disposed at a first focal point of the spheroid, and a light detector disposed at a second focal point of the spheroid.

The droplet sensor is not only a simple configuration and easily manufactured, but also achieves a highly sensitive droplet sensor having a large detection area by adjusting the eccentricity of the spheroid to maximize an area that satisfies two conditions (which will be hereinafter referred to as the effective detection area). The two conditions are that the total reflection condition at an interface with gas (e.g., air) is satisfied and the total reflection condition at an interface with liquid (e.g., water) is not satisfied.

In a case in which such a droplet sensor is used outdoors, for example, extraneous light, such as sunlight, may enter the optical cover from outside the effective detection area and enter the light detector. Because such entrance of extraneous light causes noise and makes it difficult to use the droplet sensor in a case in which a required dynamic range cannot be secured, the present applicant has proposed to form a coating film including a light-absorbing film or a light-reflective film at an area that is not an effective detection area on the surface of an optical cover.

Although formation of such a coating film is an effective measure against noise caused by extraneous light, it requires an additional manufacturing step for forming the coating film, resulting in an increase in the cost.

The present invention has an object to provide a droplet sensor that enables to suppress entrance of extraneous light into a light detector at low cost without using a coating film as described above.

SUMMARY OF THE INVENTION

In view of the above, a droplet sensor includes: an optical cover having an ellipsoid surface that is a portion of a spheroid; a light source disposed at or in proximity to a first focal point of the ellipsoid surface; and a light detector disposed at or in proximity to a second focal point of the ellipsoid surface, wherein the ellipsoid surface is an effective detection area configured to reflect light emitted from the light source toward the light detector, and an amount of light reflected by the effective detection area changes in accordance with adhesion of droplets on the ellipsoid surface, and wherein the optical cover has a curved surface that is tangentially connected to an outside of the effective detection area and having a curvature greater than a curvature of the ellipsoid surface.

Advantageous Effects of Invention

According to the present invention, it is possible to provide a droplet sensor that enables to suppress entrance of extraneous light into a light detector at low cost.

DETAILED DESCRIPTION OF THE EMBODIMENTS

In embodiments of the present invention, the presence of droplets is optically detected based on a change in the reflectance at a boundary surface of an optical cover caused by a difference in the refractive index between a gas and a liquid. Droplet sensors can be applied to the detection of droplets other than raindrops, such as condensation, waterdrops, and ink. In each of the following embodiments, an example of applying a droplet sensor to a rain sensor will be described.

First Embodiment

Figure 1:
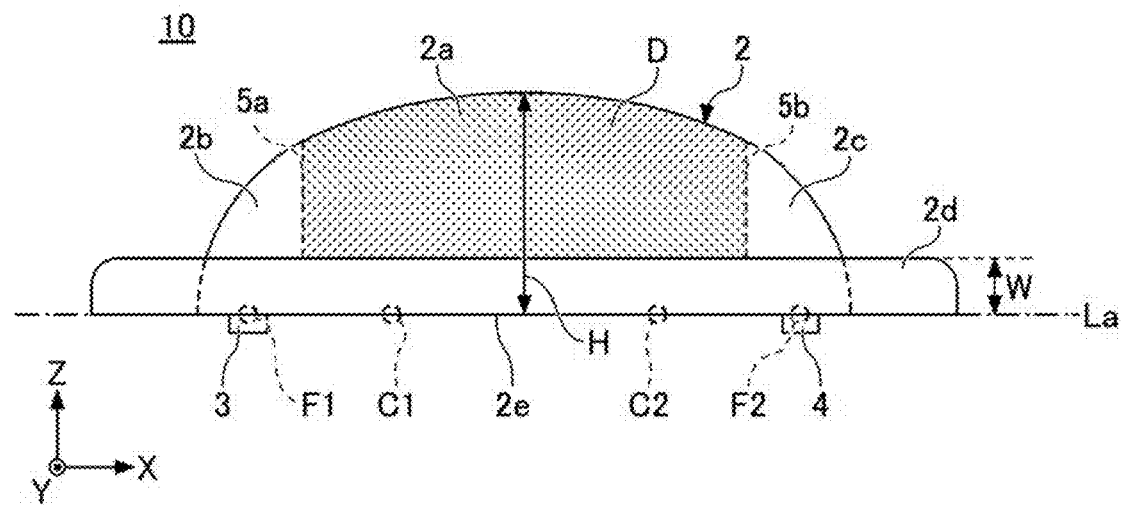
FIG. 1 is a side view of a rain sensor according to a first embodiment.
Figure 2:
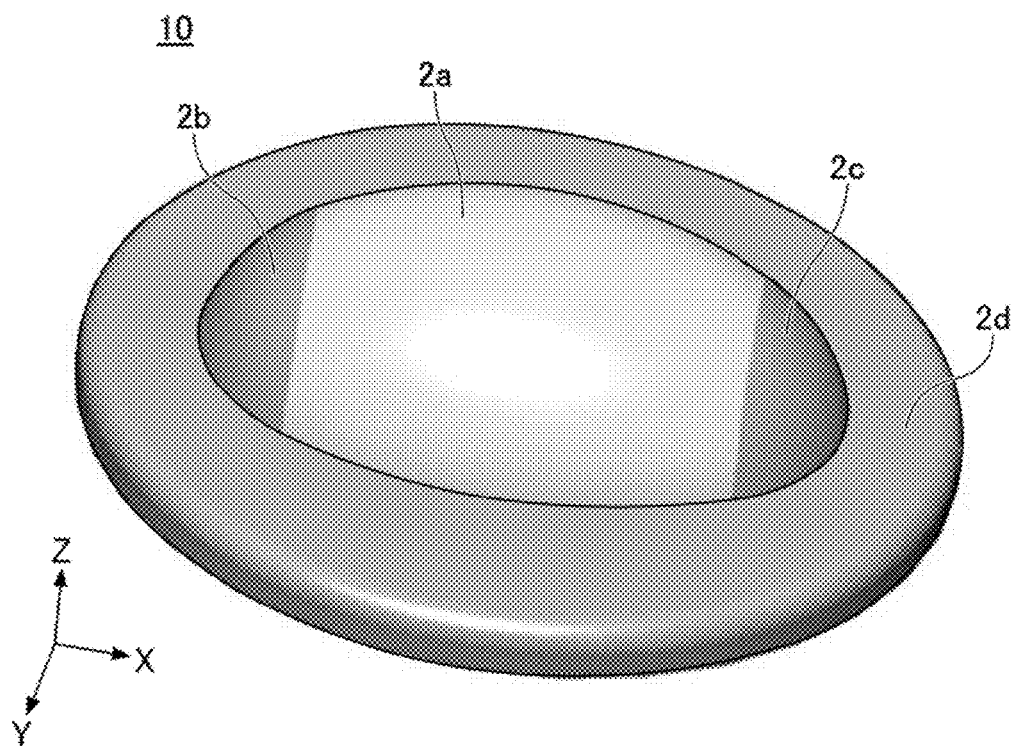
FIG. 2 is a perspective view of the rain sensor according to the first embodiment.

FIG. 1 is a side view of a rain sensor 10 according to a first embodiment. FIG. 2 is a perspective view of the rain sensor 10 according to the first embodiment. The rain sensor 10 detects adhesion of raindrops. From raindrop detection results, for example, the amount of rainfall per unit time and/or per unit area can be measured.

The rain sensor 10 includes an optical cover 2, a light emitting element 3, and a light receiving element 4. The optical cover 2 includes an ellipsoid surface 2a, sphere surfaces 2b and 2c, and a flange 2d. The light emitting element 3 is disposed at or in proximity to a first focal point F1 of the ellipsoid surface 2a. The light receiving element 4 is disposed on or in proximity to a second focal point F2 of the ellipsoid surface 2a. Here, the light emitting element is an example of a light source, and the light receiving element 4 is an example of a light detector.

The optical cover 2 is a solid cove and is made of a material that is transparent to a wavelength of light emitted by the light emitting element 3. The optical cover 2 may be made of a resin, such as polycarbonate or acrylic, as well as transparent ceramic, glass, high refractive index plastic, or the like.

The ellipsoid surface 2a is an area that corresponds to an effective detection area D, which will be described later below. The sphere surfaces 2b and 2c are connected to the outside of the ellipsoid surface 2a in the longitudinal axis direction so that the slope is smoothly continuous with the ellipsoid surface 2a. Specifically, the ellipsoid surface 2a and the sphere surface 2b are connected (tangentially connected) so that their tangents match at the boundary line 5a of these (see FIG. 3). Similarly, the ellipsoid surface 2a and the sphere surface 2c are connected (tangentially connected) so that their tangents match at the boundary line 5b of these (see FIG. 3).

The ellipsoid surface 2a is a portion of the surface of a spheroid that is obtained by rotating an ellipse, having the major axis in the X direction (La illustrated in FIG. 1) and the minor axis in the Y direction, about the major axis La. The sphere surface 2b is a portion of the surface of a sphere having a center C1 at a point on the major axis La. Similarly, the sphere surface 2c is a portion of the surface of a sphere having a center C2 at a point on the major axis La.

For the portion other than the flange 2d, the optical cover 2 has a three-dimensional shape obtained by cutting out a rotation body, which is obtained by rotating a planar shape having the ellipsoid surface 2a and the sphere surfaces 2b and 2c about the major axis La as an axis, at a horizontal plane that is parallel to the XY plane including the major axis La. In FIG. 1 and FIG. 2, for convenience, the height direction of the optical cover 2 is defined as the Z direction.

The flange 2d is a portion that extends from a lower portion of the optical cover 2 in the XY plane direction, and the planar shape is, for example, circular. It should be noted that the planar shape of the flange 2d is not limited to this, and may be an elliptical shape, a quadrilateral shape or another shape. The flange 2d has a fixed thickness W in the Z direction. The thickness W of the flange 2d is, for example, approximately 25% of the height H of the optical cover 2. The flange 2d functions as a mounting part for fixing the optical cover 2 to a main body or the like. The thickness W of the flange 2d may be 25% or less of the height H of the optical cover 2, as long as the strength against the stress applied to fixing can be maintained, that is, for example, the optical cover is not damaged by tightening a screw when the mounting part is screwed to fix the optical cover.

The light emitting element 3 is a light emitting diode that emits, for example, near-infrared light. The light receiving element 4 is, for example, a quantum well light receiving element having sensitivity to light in the near-infrared range. The light emitting element 3 emits light toward the ellipsoid surface 2a of the optical cover 2. The light receiving element 4 receives light that is emitted from the light emitting element 3 and that is reflected by the ellipsoid surface 2a of the optical cover 2. The light emitting element 3 and the light receiving element 4 are mounted on a substrate (which is not illustrated).

The effective detection area D indicated by dotted-hatching in FIG. 1 is an area that totally reflects light emitted from the light emitting element 3 in a case in which the optical cover 2 is surrounded by air, and corresponds to the ellipsoid surface 2a. The shape of the effective detection area D is determined such that the total reflection condition is not satisfied only when raindrops adhere. That is, the effective detection area D is an area where the total reflection condition is satisfied at an interface with gas and the total reflection condition is not satisfied at an interface with liquid. The effective detection area D for achieving the above depends on the refractive index of the optical cover 2 and the eccentricity of the ellipsoid surface 2a.

In a case in which the curved surface of the optical cover 2 is formed by a single ellipse and is formed using a resin having a refractive index of 1.57 (e.g., polycarbonate), the range of the incident angle $\theta m$ of a detectable area in which adhesion of raindrops can be detected by the optical cover 2 is approximately $39.6° < \theta m < 57.9°$. In the present embodiment, the range of the incident angle $\theta i$ that satisfies $44.3° < \theta i < 51.4°$ is used as the effective detection area D. In FIG. 1, the range satisfying the above incident angle θi is the ellipsoid surface 2a, and the sphere surfaces 2b and 2c are tangentially connected to the outside of the ellipsoid surface 2a.

The eccentricity is a value determined due to the ratio of the distance from the center of the ellipsoid surface 2a to the focal point to the major axis radius. In a case in which the refractive index of the optical cover 2 is 1.57, the area functioning as the detectable area is maximized at an eccentricity of 0.781. The shape of the detectable area is described in detail in the earlier application (Japanese Laid-open Patent Publication No. 2019-120567) submitted by the present applicant.

As described above, the flange 2d functions as a mounting part for mounting the optical cover 2 to the main body, the substrate, or the like. Because it is almost impossible for the light receiving element 4 to detect light reflected from an area of about 25% or less of the height H of the optical cover 2, the area of about 25% or less of the height H is used as the flange 2d functioning as the mounting part. This is because in a case in which a light receiving surface is oriented to an upper side, the light receiving element 4 has a high detection sensitivity to light from an upper direction and has a low detection sensitivity to light from a lateral direction (i.e., from the XY direction). By using the low sensitivity area as the flange, for the rain sensor assuming that droplets are dropped from the upper direction, the detection area for adhesion of raindrops from the upper direction is hardly reduced, and detecting the presence or absence of droplets of raindrops or collecting the amount of raindrops is not substantially affected. Therefore, it is possible to form the flange 2d as a amounting part without substantially decreasing the detection sensitivity.

Figure 3:
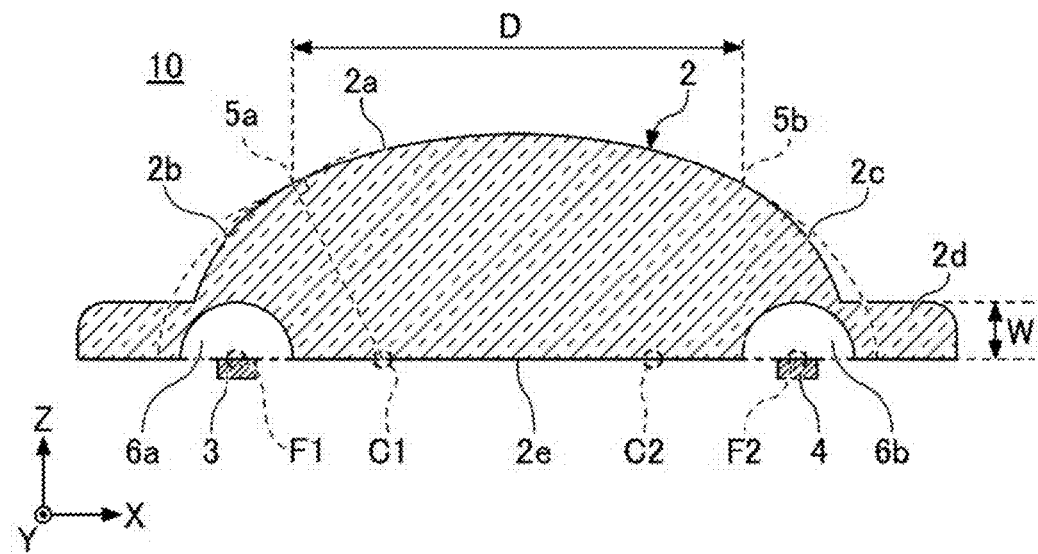
FIG. 3 is a cross-sectional view of the rain sensor.
Figure 4:
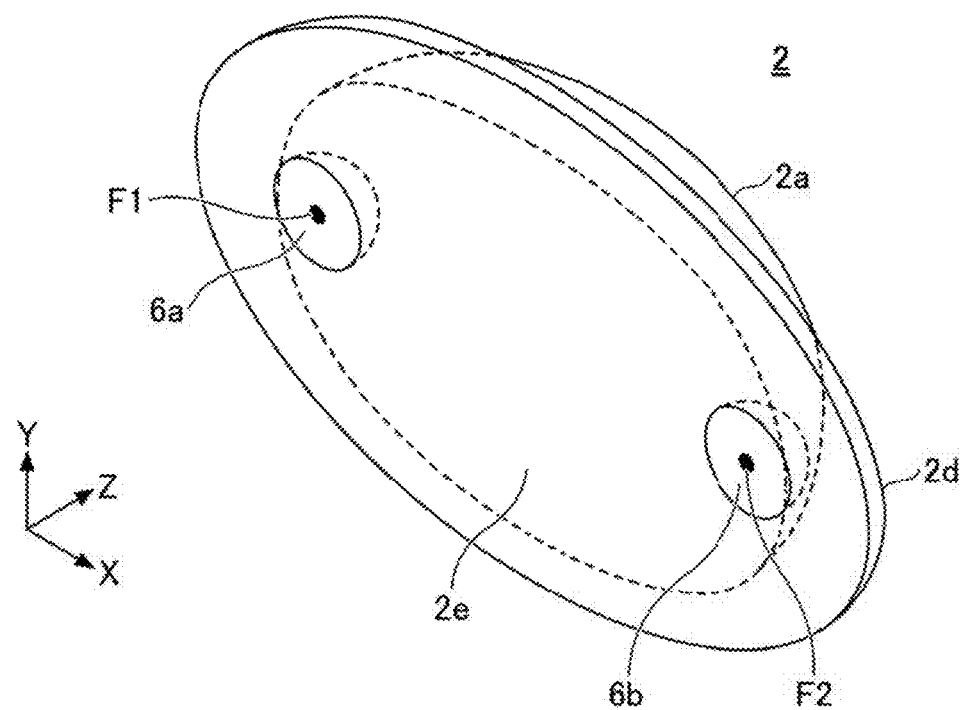
FIG. 4 is a perspective view of an optical cover viewed from a bottom side.

FIG. 3 is a cross-sectional view of the rain sensor 10 cut in the XZ plane including the major axis La. FIG. 4 is a perspective view of the optical cover 2 viewed from the bottom surface 2c side.

As illustrated in FIGS. 3 and 4, a first space 6a and a second space 6b are formed inside the optical cover 2. The first space 6a is a hemispherical space centered around the first focal point F1 at which the light emitting element 3 is disposed, and the interface with the optical cover 2 is a transmission specular surface (i.e., a surface that is smooth and does not have irregularities, through which light passes without scattering). The second space 6b is a hemispherical space centered around the second focal point F2 at which the light receiving element 4 is disposed, and the interface with the optical cover 2 is a transmission specular surface or a transmission scattering surface (i.e., a surface that has irregularities and through which light passes with scattering, such as a sand surface) and a transmitting specular surface.

In the present embodiment, the radii of the first space 6a and the second space 6b are substantially the same as the thickness W of the flange 2d.

As described above, because the surface of the first space 6a is spherical, the light emitted from the light emitting element 3 enters the inside of the optical cover 2 without being refracted. Similarly, because the surface of the second space 6b is spherical, light reflected by the ellipsoid surface 2a enters the second space 6b without being refracted. Thus, a rain sensor that uses a basic property of a spheroid, which is a property that light emitted from one focal point of an ellipse is concentrated at the other focal point, can be achieved.

Figure 5:
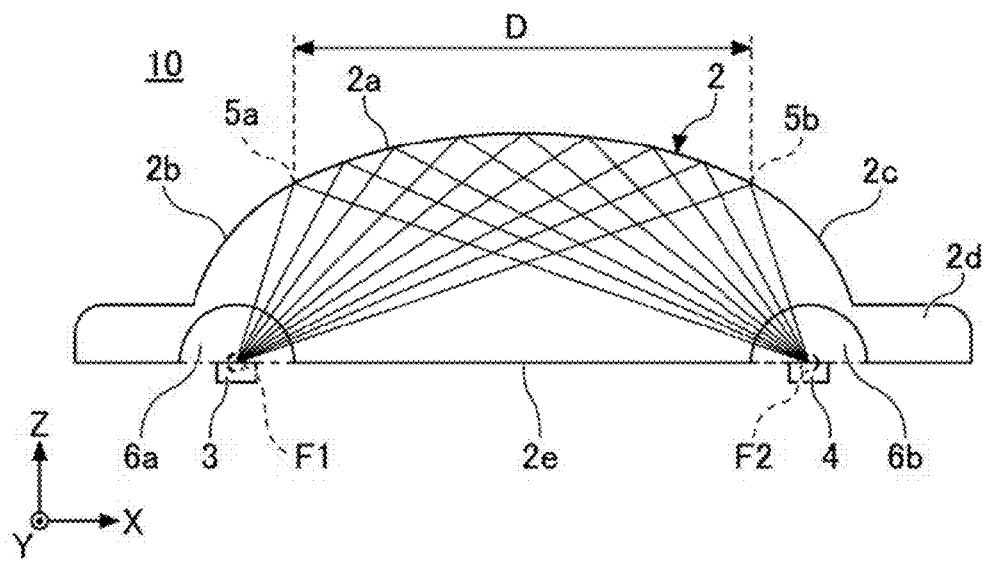
FIG. 5 is a drawing illustrating optical light paths of light that is emitted from a light emitting element and that enters a light receiving element.
Figure 6:
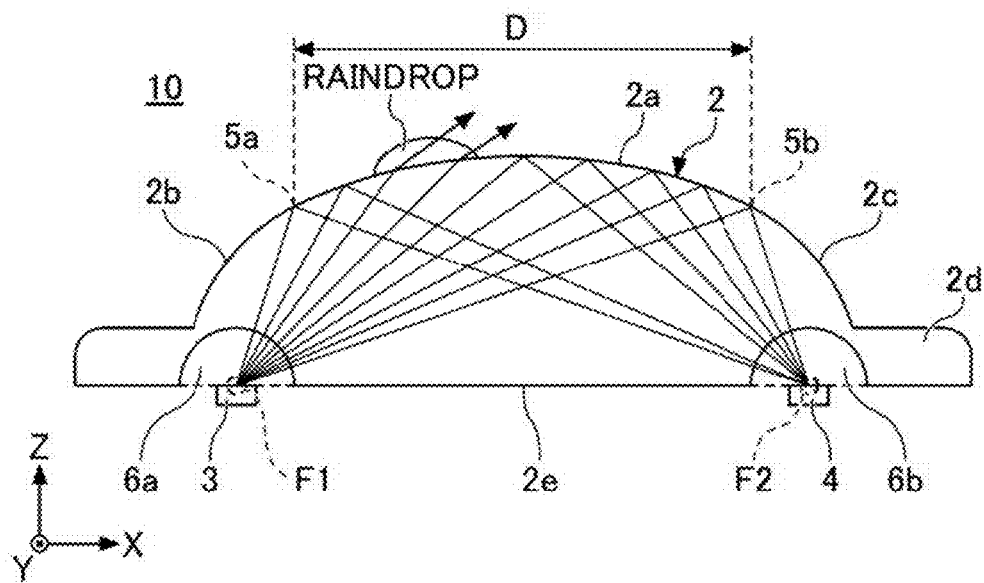
FIG. 6 is a drawing illustrating an example of a change in optical paths caused by a raindrop adhering to an effective detection area.

FIG. 5 is a drawing illustrating optical paths of light that is emitted from the light emitting element 3 and that enters the light receiving element 4. FIG. 6 is a drawing illustrating a change in the optical paths due to adhesion of a raindrop on the effective detection area D.

As illustrated in FIG. 5, in a case in which raindrops are not adhered to the effective detection area D, light that is emitted from the light emitting element 3 and that enters the effective detection area D is totally reflected and directed to the light receiving element 4. As illustrated in FIG. 6, upon a raindrop adhering to the effective detection area D, the reflectance changes because the total reflection condition is not satisfied at the interface of the effective detection area D at a portion where the raindrop adheres, so that the incident light from the light emitting element 3 is transmitted. Thus, the amount of light received by the light receiving element 4 is reduced. The presence and amount of raindrops can be detected by monitoring the change in the amount of light received by the light receiving element 4.

Figure 7A:
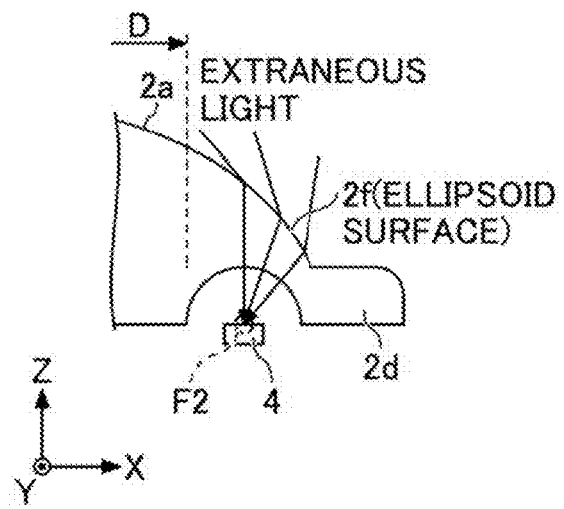
FIGS. 7A and 7B are drawings illustrating an effect of the rain sensor according to the first embodiment.
Figure 7B:
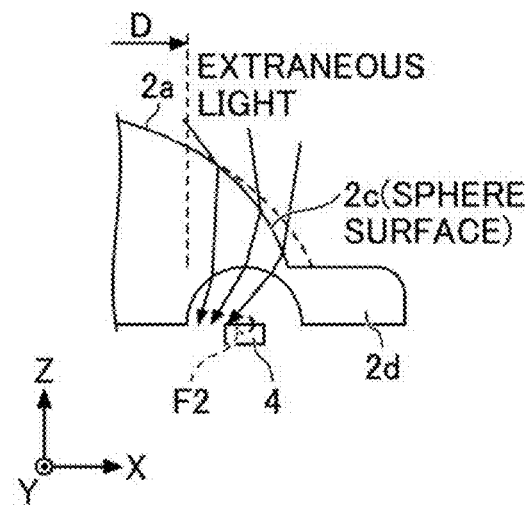

FIGS. 7A and 7B are drawings illustrating an effect of the rain sensor 10 according to the first embodiment. FIG. 7A illustrates, as a comparative example, a case where the area outside the effective detection area D of the optical cover is an ellipsoid surface. An ellipsoid surface 2f outside the effective detection area D illustrated in FIG. 7A and the ellipsoid surface 2a, which constitutes the effective detection area D, are a portion of the surface of the same spheroid. Because the ellipsoid surface 2f outside the effective detection area D has an area that does not satisfy the total reflection condition, there is an optical path in which extraneous light, such as sunlight, enters the optical cover from the ellipsoid surface 2f and reaches the light receiving element 4.

FIG. 7B illustrates a case in which the area outside the effective detection area D of the optical cover is a sphere surface. As illustrated in FIG. 7B, in the present embodiment, the curvature of the sphere surface 2c outside the effective detection area D is greater than the curvature of the ellipsoid surface 2f. Therefore, because the optical paths of the extraneous light that enters the optical cover 2 from the sphere surface 2c are deviated toward the internal direction of the optical cover 2 in comparison to the comparative example illustrated in FIG. 7A, the entrance of the extraneous light into the light receiving element 4 is suppressed.

Figure 8A:
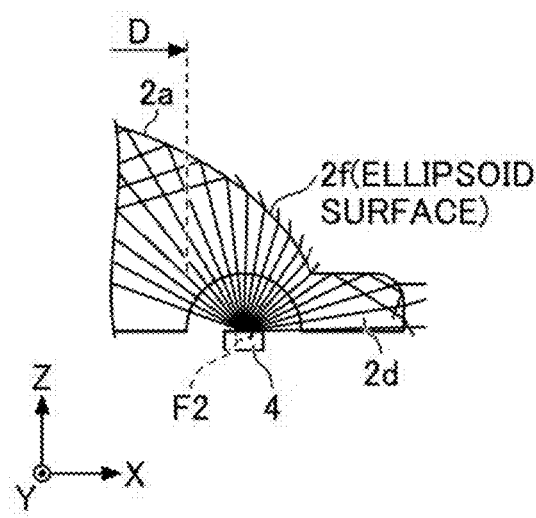
FIGS. 8A and 8B are simulation drawings illustrating optical paths in a case in which a virtual light source is disposed at a second focal point.
Figure 8B:
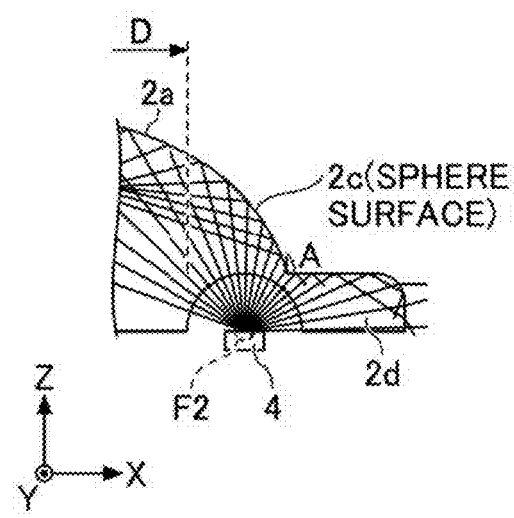

FIGS. 8A and 8B are drawings illustrating results obtained by simulation of optical paths in a case in which a virtual light source is disposed at the second focal point F2 in order to confirm the entrance paths of extraneous light. Based on the principle of ray reversibility, if light that leaks to the outside is present in light emitted from the virtual light source disposed at the position of the light receiving element 4, this means that optical paths are present through which light that travels in the opposite direction from the outside enters the light receiving element 4. Conversely, if light that leaks to the outside is not present (for example, if all light beams finally travel in the downward direction of the optical cover), this means that there is no optical path through which light from the upward direction of the optical cover enters the light receiving element 4. Here, the refractive index of the optical cover is 1.57 and air (refractive index 1.0) is around the optical cover. Because the light emitted from the virtual light source is totally reflected at the interface between the optical cover and air and does not leak in the upward direction to outside the optical cover, it can be confirmed that extraneous light does not enter the light receiving element 4 disposed at the second focal point F2.

FIG. 8A illustrates, as a comparative example, a case in which the area outside the effective detection area D of the optical cover is an ellipsoid surface. As illustrated in FIG. 8A, for the ellipsoid surface 2f outside the effective detection area D, a large number of optical paths are present through which light emitted from the virtual light source leaks, in the upward direction, to outside the optical cover. That is, in the ellipsoid surface 2f, an area that directs the extraneous light to the second focal point F2 is widely present.

FIG. 8B illustrates a case in which the area outside the effective detection area D of the optical cover 2 is a sphere surface. As illustrated in FIG. 8B, in the present embodiment, most of the light that is emitted from the virtual light source and enters the sphere surface 2c is totally reflected, and there is no optical path that leaks to outside (in the upward direction) the optical cover 2, except near the area A. That is, on the sphere surface 2c, there is almost no area that directs the extraneous light to the second focal point F2. However, near the connection portion of the sphere surface 2c with the flange 2d, there is a small area (area A illustrated in FIG. 8B) where light emitted from the virtual light source Leaks to outside the optical cover. Although there is a possibility that extraneous light enters from the area A toward the second focal point F2, it is possible to reduce the area A by changing the thickness W of the flange 2d or the radius of the space 6b, as will be specifically described in detail as of the second embodiment.

As described above, because the rain sensor 10 according to the present embodiment includes the optical cover 2 in which the outside of the ellipsoid surface 2a, which is the effective detection area D, in the major axis direction is the sphere surfaces 2b and 2c, the entrance of extraneous light into the light receiving element 4 is suppressed. Also, the rain sensor 10 according to the present embodiment can be manufactured at a low cost because it is not necessary to form, in order to suppress the entrance of extraneous light into the light receiving element 4, a shielding coating film on the optical cover 2 to restrict the entrance light and it is not necessary to add a manufacturing step. The optical cover 2 can be manufactured, for example, by resin injection molding using a mold.

Also, because the ellipsoid surface 2a and the sphere surfaces 2b and 2c are tangentially connected, the property that water droplets that adhere to the surface of the optical cover 2 naturally flow down along the surface is maintained.

Although the possibility that extraneous light that enters from the area A in FIG. 8B toward the second focal point F2 has been described above in the first embodiment, various embodiments for preventing the entrance of extraneous light from the area A will be described below.

Second Embodiment

Figure 9:
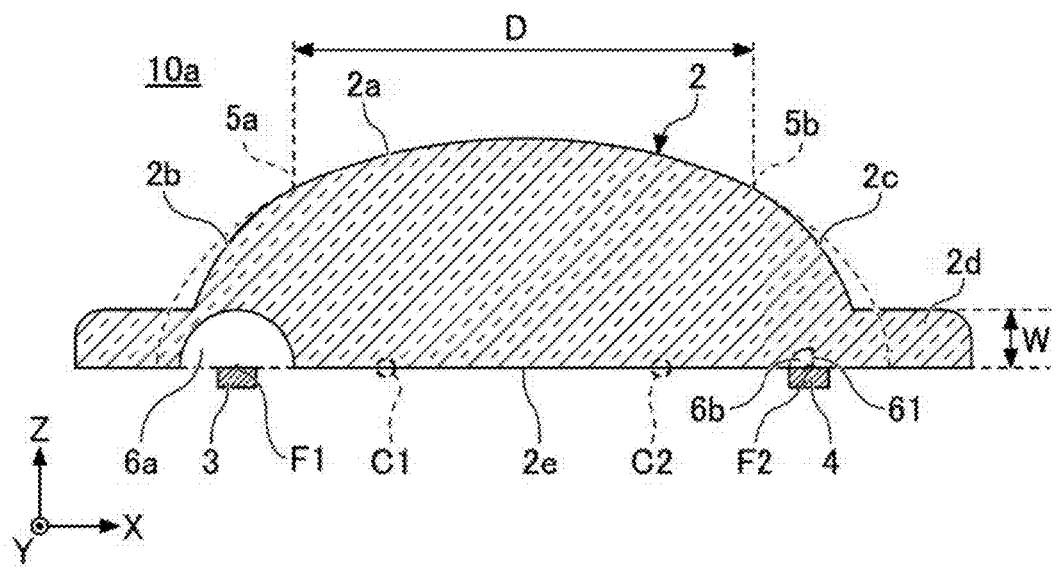
FIG. 9 is a cross-sectional view illustrating a configuration of a rain sensor according to a second embodiment.

FIG. 9 is a cross-sectional view illustrating a configuration of a rain sensor 10a according to a second embodiment. The rain sensor 10a according to the second embodiment has a configuration similar to that of the rain sensor 10 according to the first embodiment with the exception that the configuration of the second space 6b in which the light receiving element 4 is disposed is different.

Figure 10:
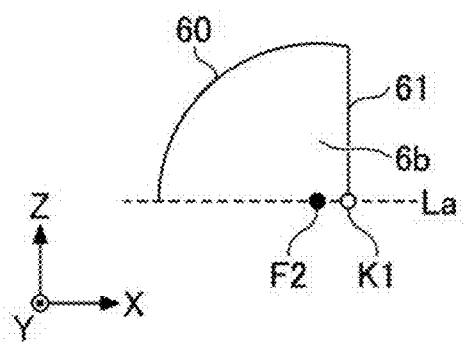
FIG. 10 is an enlarged view of a second space according to the second embodiment.

FIG. 10 is an enlarged view of the second space 6b according to the present embodiment. As illustrated in FIG. 10, in the present embodiment, a shape of the second space 6b is obtained by cutting a hemisphere, which is obtained by cutting a sphere centered on the second focal point F2 at the XY plane including the second focal point F2, at the YZ plane. Accordingly, a sphere surface 60 and a plane 61 are formed between the second space 6b and the optical cover 2. The plane 61 is located outside the second focal point F2 (toward the flange 2d illustrated in FIG. 11). That is, the second focal point F2 is located within the second space 6b.

Also, as illustrated in FIG. 9, in the present embodiment, the radius of the sphere surface 60, which corresponds to the size of the second space 6b, is set to be a value smaller than that of the second space 6b according to the first embodiment, and is smaller than the thickness W of the forearm portion 2d.

The sphere surface 60 is a transmission specular surface or a transmission scattering surface similar to that of the first embodiment in order to reflect light emitted from the light emitting element 3 by the ellipsoid surface 2a to direct the light toward the second focal point F2. The plane 61 functions to prevent the light from reaching the light receiving element 4 by totally reflecting or refracting the light that enters from the outside toward the second focal point F2. The plane 61 and a reduction in the radius of the sphere surface 60 have an effect of eliminating the area A described in the first embodiment.

Figure 11:
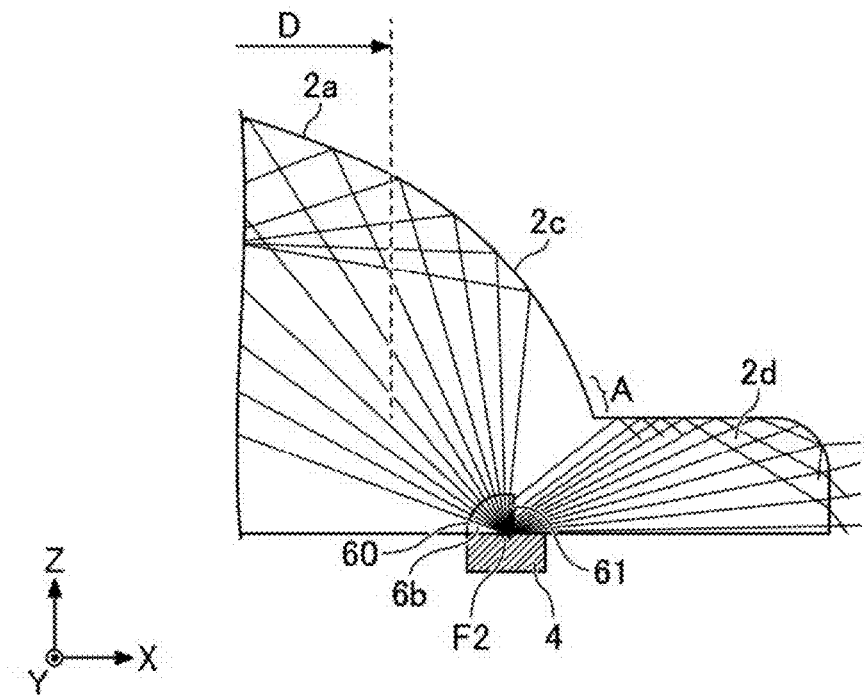
FIG. 11 is a simulation drawing illustrating optical paths in a case in which a virtual light source is disposed at a second focal point.

FIG. 11 is a drawing illustrating a result of simulation of optical paths in a case in which a virtual light source is disposed at the second focal point F2 in order to confirm the entrance paths of extraneous light. In the present embodiment, by changing the optical paths of light emitted from the virtual light source to the flange 2d on the right side of the area A, and to optical paths in a direction in which the total reflection condition is satisfied within the flange 2d, the area A is eliminated. As illustrated in FIG. 11, the light that is emitted from the virtual light source disposed at the second focal point F2 to enter the plane 61 is refracted at the plane 61 to be directed toward the flange 2d. As also illustrated in FIG. 10, the lower end point K1 of the plane 61 is located on the right side of the focal point F2. That is, in the first embodiment, the light that travels from the virtual light source toward the area A of the sphere surface 2c (see FIG. 8B) is refracted at the plane 61 of FIG. 10, and thereby, the light is directed toward the flange 2d located outside the sphere surface 2c and the optical paths are changed in the direction such that the total reflection condition is satisfied in the flange 2d. Therefore, it can be confirmed that extraneous light is prevented from reaching the light receiving element 4. It should be noted that in order to direct all the light refracted at the plane 61 to the outside of the sphere surface 2c, the size of the second space 6b (the radius of the sphere surface 60) and the position of the plane 61 need to be properly set.

On the other hand, light emitted from the virtual light source disposed at the second focal point F2 and entering the sphere surface 60 passes through the sphere surface 60 and is totally reflected at the ellipsoid surface 2a (effective detection area D) or the sphere surface 2c.

As described above, in the present embodiment, the optical paths of extraneous light that enters from the area A of the sphere surface 2c and travels toward the second focal point F2 are changed by the plane 61, which functions as an optical path change portion, and the extraneous light is prevented from entering the light receiving element 4 located at the second focal point F2.

Third Embodiment

Figure 12:
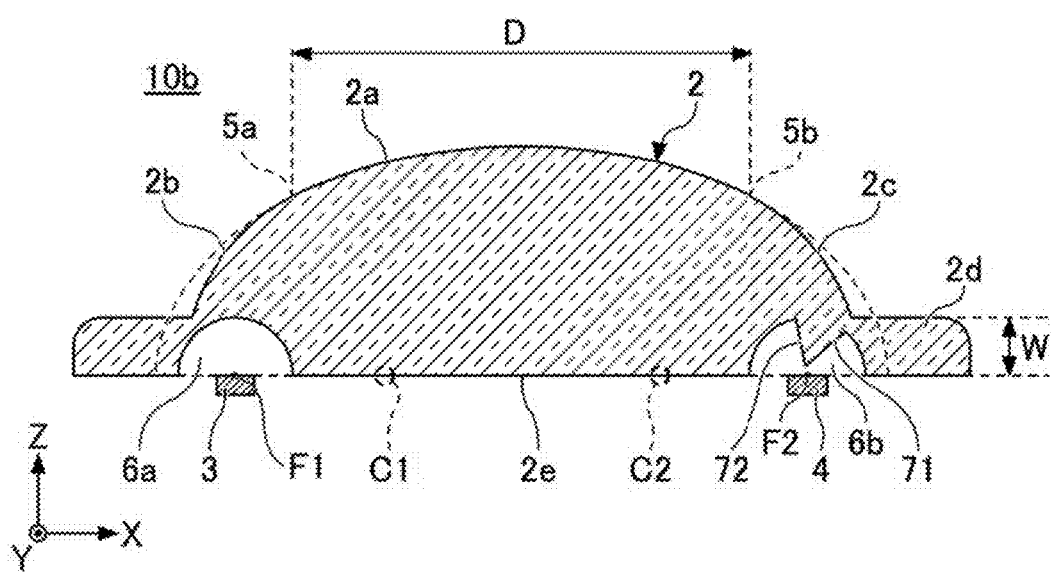
FIG. 12 is a cross-sectional view illustrating a configuration of a rain sensor according to a third embodiment.

FIG. 12 is a cross-sectional view illustrating a configuration of the rain sensor 10b according to a third embodiment. The rain sensor 10b according to the third embodiment has a configuration similar to that of the rain sensor 10 according to the first embodiment with the exception that the configuration of the second space 6b in which the light receiving element 4 is disposed is different.

Figure 13:
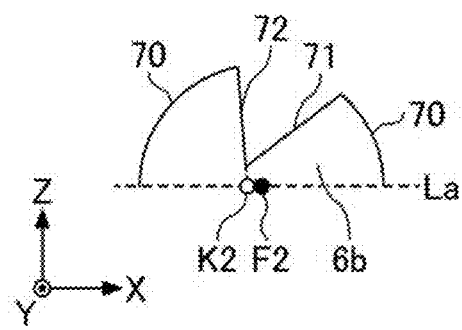
FIG. 13 is an enlarged view of a second space according to the third embodiment.
Figure 14:
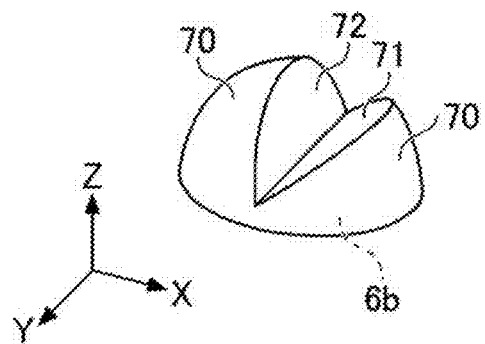
FIG. 14 is a perspective view illustrating the second space according to the third embodiment.

FIG. 13 is an enlarged view of the second space 6b according to the present embodiment. FIG. 14 is a perspective view illustrating the second space 6b according to the present embodiment. As illustrated in FIG. 13 and FIG. 14, in the present embodiment, the shape of the second space 6b is obtained by forming a wedge-shaped notch on a hemisphere, which is obtained by cutting a sphere centered on the second focal point F2 at the XY plane including the second focal point F2.

Accordingly, a sphere surface 70, a first plane 71, and a second plane 72 are formed between the second space 6b and the optical cover 2. The first plane 71 and the second plane 72 are each orthogonal to the XZ plane. The line of intersection between the first plane 71 and the second plane 72 is parallel to the Y direction. The second focal point F2 is located within the second space 6b.

In the present embodiment, the radius of the sphere 70, which corresponds to the size of the second space 6b, is the same as the thickness W of the flange 2d similarly to the first embodiment.

The sphere surface 70 is a transmission specular surface or a transmission scattering surface similar to that of the first embodiment in order to reflect light emitted from the light emitting element 3 by the ellipsoid surface 2a to direct the light toward the second focal point F2. The first plane 71 and the second plane 72 function to prevent the light from reaching the light receiving element 4 by totally reflecting or refracting the light that enters from the outside toward the second focal point F2. The first plane 71 and the second plane 72 have an effect of eliminating the area A described in the first embodiment.

Figure 15:
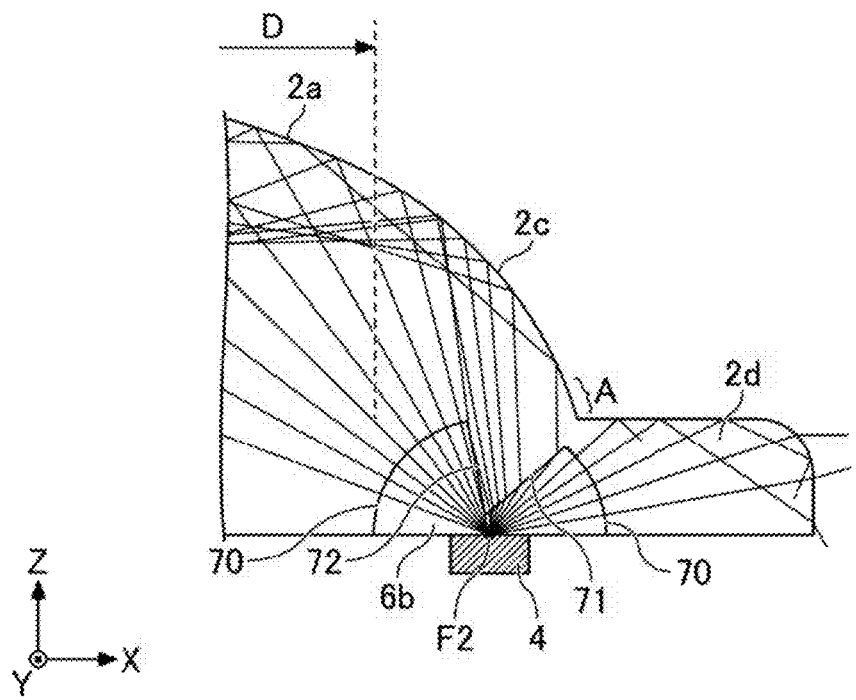
FIG. 15 is a simulation drawing illustrating of optical paths in a case in which a virtual light source is disposed at a second focal point.

FIG. 15 is a drawing illustrating a result of simulation of optical paths in a case in which a virtual light source is disposed at the second focal point F2 in order to confirm the entrance paths of extraneous light. In the present embodiment, by changing the optical paths of light emitted from the virtual light source to the left side (in the direction of toward the ellipsoid surface 2a) with respect to the area A, the area A is eliminated. As illustrated in FIG. 15, the light emitted from the virtual light source disposed at the second focal point F2 to enter the first plane 71 is refracted at the first plane 71 to travel toward the sphere surface 2c. As also illustrated in FIG. 13, the point K2 of intersection between a plane obtained by extending the plane 72 and the major axis La is located on the left side with respect to the focal point F2. That is, the light that travels from the virtual light source toward the area A of the sphere surface 2c (see FIG. 8B) in the first embodiment is refracted at the first plane 71, and thereby it can be confirmed that the optical paths are changed so that the light enters, with respect to the sphere surface 2c or the ellipsoid surface 2a that is inward with respect to the area A of the sphere surface 2c, at an angle that satisfies the total reflection condition (that is, the optical paths through which extraneous light reaches the light receiving element 4 are avoided). Also, a portion of the light refracted by the first plane 71 travels toward the second plane 72 and is totally reflected by the second plane 72. The light reflected at the second plane 72 travels toward an area inward with respect to the area A of the sphere surface 2c.

As described above, in the present embodiment, the optical paths of extraneous light that enters from the area A of the sphere surface 2c and travels toward the second focal point F2 are changed by the first plane 71 and the second plane 72, which function as an optical path change portion, and the extraneous light is prevented from entering the light receiving element 4 located at the second focal point F2. It should be noted that the radius of the sphere surface 70, the angle of tilt of the first plane 71 and the second plane 72, and the like may be changed as appropriate depending on the conditions such as the refractive index of the ellipse, the eccentricity, the radii of the first and second spaces 6a and 6b, and the height of the flange 2d so that the light shielding performance works most effectively.

Figure 16:
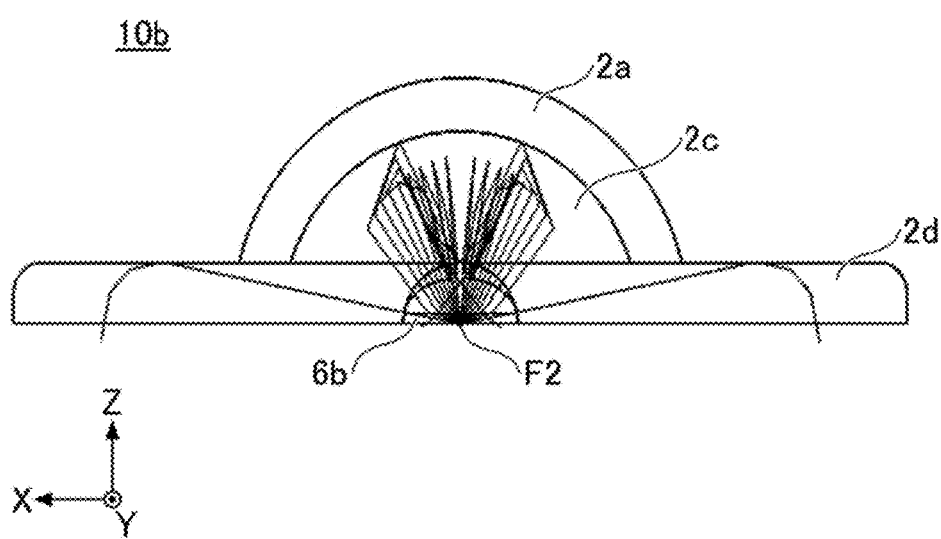
FIG. 16 is a simulation drawing illustrating optical paths viewed from a direction parallel to the major axis in a case in which a virtual light source is disposed at a second focal point.

FIG. 16 is a simulation drawing illustrating optical paths viewed from a direction parallel to the major axis La in a case in which a virtual light source is disposed at the second focal point F2. As illustrated in FIG. 16, because there is no optical path through which light leaks in the upward direction from the sphere surface 2c not only in optical paths that are parallel to the XZ-plane but also in optical paths that are not parallel to the XZ-plane, it can be confirmed that there is no optical path through which the extraneous light enters the light receiving element 4 disposed at the second focal point F2.

Fourth Embodiment

Figure 17:
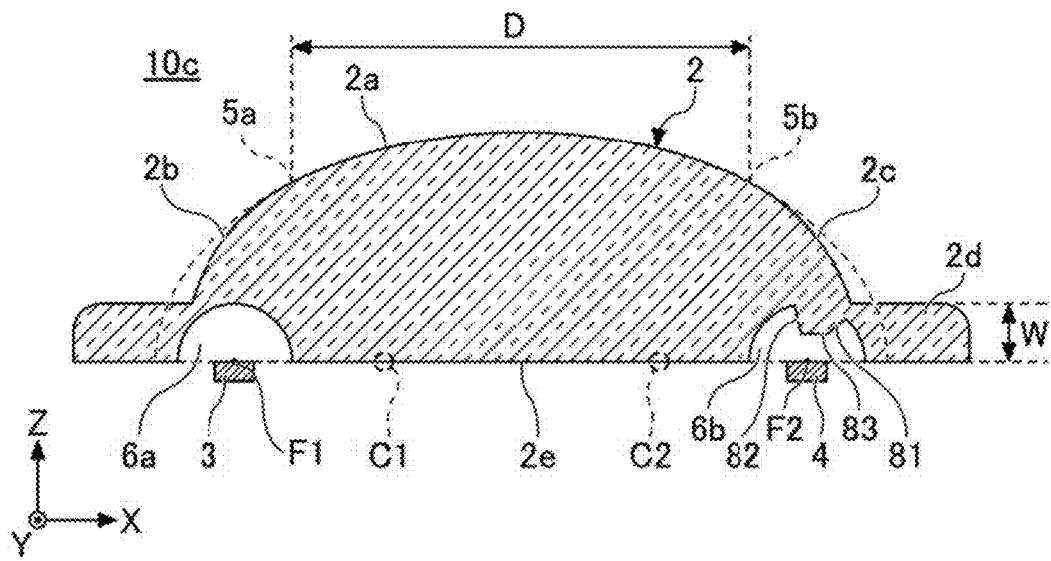
FIG. 17 is a cross-sectional view illustrating a configuration of a rain sensor according to a fourth embodiment.

FIG. 17 is a cross-sectional view illustrating a configuration of a rain sensor 10c according to a fourth embodiment. The rain sensor 10c according to the fourth embodiment has a configuration similar to that of the rain sensor 10 according to the first embodiment with the exception that the configuration of the second space 6b in which the light receiving element 4 is disposed is different. The present embodiment is an embodiment that is easier to form and more feasible in light of the characteristics and effectiveness of the embodiments described above.

Figure 18:
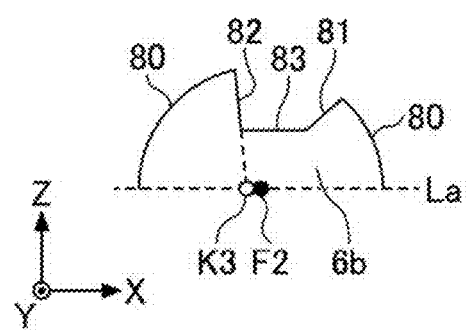
FIG. 18 is an enlarged view of a second space according to the fourth embodiment.
Figure 19:
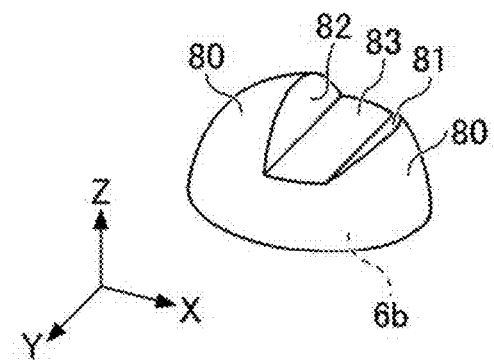
FIG. 19 is a perspective view illustrating the second space according to the fourth embodiment.

FIG. 18 is an enlarged view of the second space 6b according to the present embodiment. FIG. 19 is a perspective view illustrating the second space 6b according to the present embodiment. In the present embodiment, by changing the optical paths of light emitted from the virtual light source to the left side (in the direction of toward the ellipsoid surface 2a) with respect to the area A, the area A is eliminated. As illustrated in FIG. 18 and FIG. 19, in the present embodiment, the shape of the second space 6b is obtained by forming a wedge-shaped notch with a flat tip on a hemisphere, which is obtained by cutting a sphere centered on the second focal point F2 at the XY plane including the second focal point F2.

Accordingly, a sphere surface 80, a first plane 81, a second plane 82, and a third plane 83 are formed between the second space 6b and the optical cover 2. The first plane 81, the second plane 82, and the third plane 83 are each orthogonal to the XZ plane. The third plane 83 is parallel to the XY plane, for example. The third plane 83 intersects with the first plane 81 and the line of intersection is parallel to the Y direction. The third plane 83 intersects with the second plane 82 and the line of intersection is parallel to the Y direction. The second focal point F2 is located within the second space 6b.

In the present embodiment, the radius of the sphere surface 80, which corresponds to the size of the second space 6b, is the same as the thickness W of the flange 2d.

The sphere surface 80 is a transmission specular surface or a transmission scattering surface similar to that of the first embodiment in order to reflect light emitted from the light emitting element 3 by the ellipsoid surface 2a to direct the light toward the second focal point F2. Similar to the first plane and the second plane 72 according to the third embodiment, the first plane 81, the second plane 82, and the third plane 83 function to prevent the light from reaching the light receiving element by totally reflecting or refracting the light that enters from the outside toward the second focal point F2. The first plane 81, the second plane 82, and the third plane have an effect of eliminating the area A described in the first embodiment.

Figure 20:
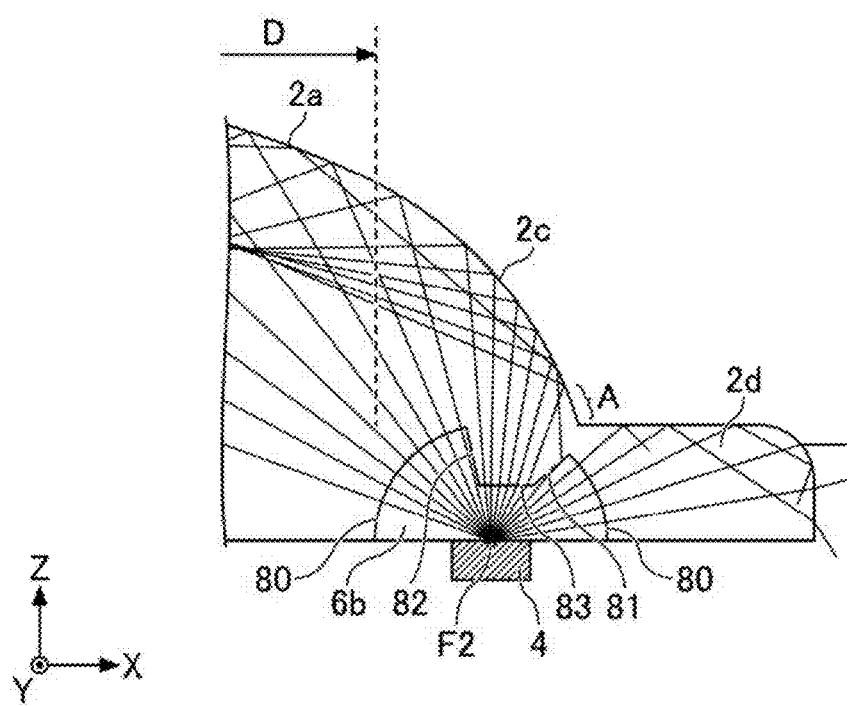
FIG. 20 is a simulation drawing illustrating of optical paths in a case in which a virtual light source is disposed at a second focal point.

FIG. 20 is a drawing illustrating a result of simulation of optical paths in a case in which a virtual light source is disposed at the second focal point F2 in order to confirm the entrance paths of extraneous light. As illustrated in FIG. 20, the light emitted from the virtual light source disposed at the second focal point F2 to enter the first plane 81 is refracted at the first plane 81 to travel toward the sphere surface 2c. Similarly, the light emitted from the virtual light source disposed at the second focal point F2 to enter the third plane 83 is slightly refracted at the third plane 83 to travel toward the sphere surface 2c. As also illustrated in FIG. 18, the point K3 of intersection between a plane obtained by extending the plane 81 and the major axis La is located on the left side with respect to the focal point F2. That is, the light that travels from the virtual light source toward the area A of the sphere surface 2c (see FIG. 8B) in the first embodiment is refracted at the first plane 81 or the third plane 83, and thereby the optical paths are changed so that the light enters an area that is inward with respect to the area A of the sphere surface 2c at an angle that satisfies the total reflection condition. Therefore, it can be confirmed that the optical paths through which extraneous light reaches the light receiving element 4 are avoided.

As described above, in the present embodiment, the optical paths of extraneous light that enters from the area A of the sphere surface 2c and travels toward the second focal point F2 are changed by the first plane 81, the second plane 82, and the third plane 83, which function as an optical path change portion, and the extraneous light is prevented from entering the light receiving element 4 located at the second focal point F2. It should be noted that the radius of the sphere surface 80, the angle of tilt of the first plane 81, the second plane 82, and the third plane 83, and the like may be changed as appropriate depending on the conditions such as the refractive index of the ellipse, the eccentricity, the radii of the first and second spaces 6a and 6b, and the height of the flange 2d so that the light shielding performance works most effectively.

Figure 21:
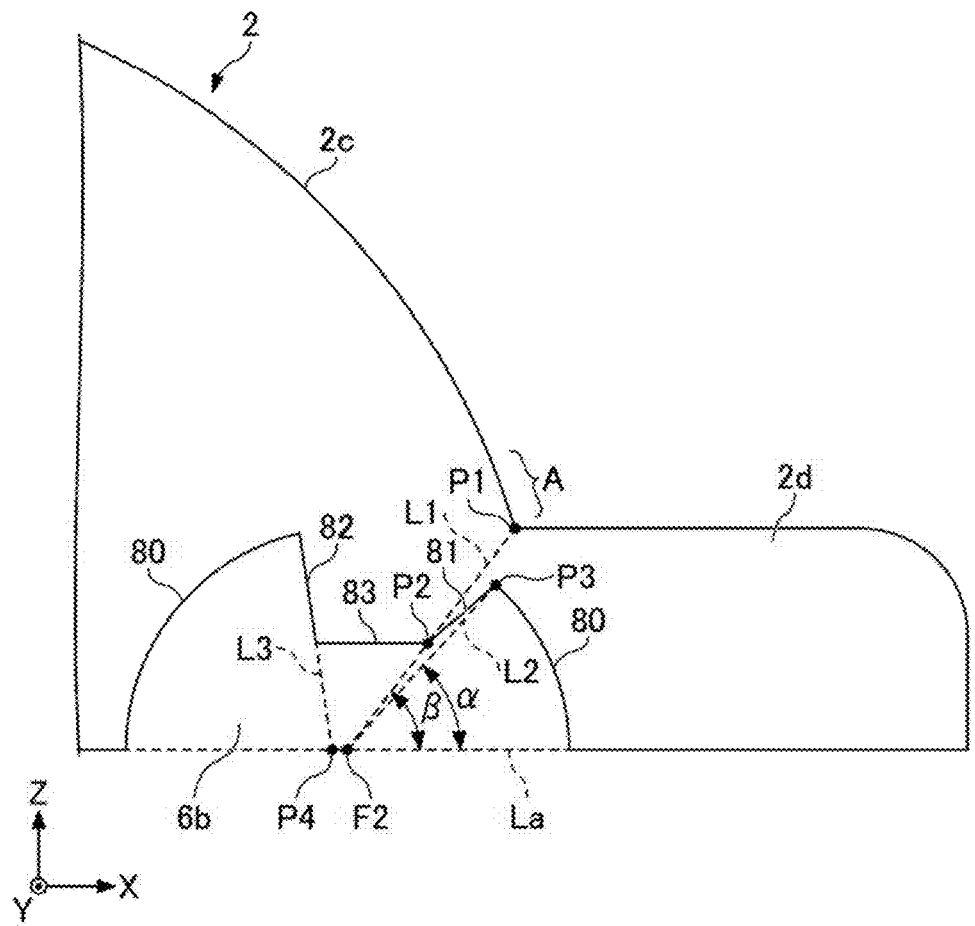
FIG. 21 is a drawing that depicts the setting conditions of a first plane, a second plane, and a third plane included in a second space.

Next, the setting conditions of the first plane 81, the second plane 82, and the third plane 83 will be described. FIG. 21 is a drawing that depicts the setting conditions of the first plane 81, the second plane 82, and the third plane 83 included in the second space 6b.

As illustrated in FIG. 21, in the XZ-plane, a point of intersection where the sphere surface 2c and the flange 2d intersect is P1, and a straight line connecting the point P1 of intersection and the second focal point F2 is L1. The first plane 81 is a plane orthogonal to the XZ plane that includes a straight line connecting a point P2 and a point P3 on the sphere surface 80.

It should be noted that the distance from the point P2 to the second focal point F2 is shorter than the radius of the sphere surface 80. Also, the point P3 is located on the flange 2d side with respect to the straight line L1. That is, an angle α formed by a straight line L2, connecting the point P3 and the second focal point F2, and the major axis La is smaller than an angle β formed by the straight line L1 and the major axis La.

The third plane 83 is a plane parallel to the XY plane including the point P2. The second plane 82 is set so that a point P4 of the intersection at which a hypothetical extension line L3 extended toward the major axis La and the major axis La intersect is located to be inward with respect to the second focal point F2 (on the opposite side of the flange 2d).

Figure 22:
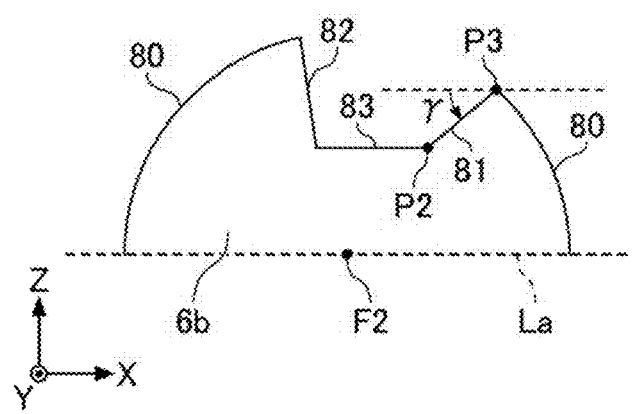
FIG. 22 is a drawing illustrating a setting condition of a tilt angle of the first plane.

Also, as illustrated in FIG. 22, an angle γ formed by the first plane 81 and the XY plane is required to be a value that is greater than 0 at least.

Other Embodiments

Although the sphere surfaces 2b and 2c are tangentially connected to the outside of the ellipsoid surface 2a as the effective detection area D of the optical cover in the embodiments described above, curved surfaces having a shape other than the spherical surfaces may be tangentially connected. Such a curved surface may be a portion of the surface of a rotation body centered on the major axis La of the ellipsoid surface 2a and may have a curvature greater than that of the ellipsoid surface 2a.

Also, in a case in which an optical path change portion as indicated in the second to fourth embodiments described above is formed in the second space 6b in which the light receiving element 4 is disposed, the area outside the effective detection area D of the optical cover may be an ellipsoid surface (ellipsoid surface 2f illustrated in FIG. 7A). The ellipsoid surface 2a and the ellipsoid surface 2f are a portion of the same spheroid. In this case, depending on the conditions such as the refractive index, the eccentricity, and the height of the flange 2d, by the optical paths of extraneous light being changed by the optical path change portion, it may be possible not only to suppress the entrance of the extraneous light into the light receiving element 4 but also to prevent the entrance of the extraneous light.

Also, in the embodiments described above, the description of optical paths is simplified such that the light emitting surface of the light emitting element 3 and the light receiving surface of the light receiving element 4 are respectively present at the first focal point F1 and the second focal point F2. However, because the light emitting surface of the light emitting element 3 and the light receiving surface of the light receiving element 4 actually functioning have finite sizes, it is preferable to form an optical path changing so as to obtain required light shielding performance in consideration of the actual sizes of the light emitting surface and the light receiving surface.

Although the light emitting element 3 and the light receiving element 4 are respectively disposed at or in proximity to the first focal point F1 and the second focal point F2 in the droplet sensor according to the present invention, it is preferable to arrange the light emitting element 3 and the light receiving element in accordance with, the emission light profile, the shape, and the size of the light emitting portion of the light emitting element 3, and the shape and the size of the light receiving portion of the light receiving element 4.

Also, the droplet sensor according to the present invention can also be applied to a rain sensor, a condensation sensor, or the like. The rain sensor can be installed on, for example, a street tree, a street lamp, or the like to measure local rainfall distribution, to collect weather information, or to control a wiper of a vehicle. The condensation sensor can be used in office automation equipment such as a copy machine or a server device. In addition, the rain sensor can be incorporated into an environmental sensor and used in combination with another sensor (such as a temperature sensor or an air flow rate sensor).

What is claimed is:

1. A droplet sensor comprising:
    an optical cover having an ellipsoid surface that is a portion of a spheroid;
    a light source disposed at or in proximity to a first focal point of the ellipsoid surface; and
    a light detector disposed at or in proximity to a second focal point of the ellipsoid surface,
    wherein the ellipsoid surface is an effective detection area configured to reflect light emitted from the light source toward the light detector, and an amount of light reflected by the effective detection area changes in accordance with adhesion of droplets on the ellipsoid surface,
    wherein the optical cover has a curved surface that is connected to an outside of the effective detection area and having a curvature greater than a curvature of the ellipsoid surface, and
    wherein a tangent to an imaginary curved surface at a boundary and a tangent to an imaginary ellipsoid surface at the boundary are the same, the imaginary curved surface being formed by extending the curved surface beyond the boundary, the imaginary ellipsoid being formed by extending the ellipsoid surface beyond the boundary, the boundary being a boundary between the curved surface and the ellipsoid surface.

2. The droplet sensor as claimed in claim 1, wherein the curved surface is a portion of a surface of a sphere centered on a point on a major axis of the ellipsoid surface.

3. The droplet sensor as claimed in claim 2, wherein a shape of the optical cover is obtained by cutting the spheroid and the sphere at a plane including the major axis.

4. The droplet sensor as claimed in claim 3, wherein in the optical cover, a first space having a sphere surface centered on the first focal point and a second space having a sphere surface centered on the second focal point are formed.

5. The droplet sensor as claimed in claim 4, wherein the second space includes, at an interface with the optical cover, an optical path change portion that changes an optical path of extraneous light that enters the sphere surface from outside the optical cover and travels toward the second focal point.

6. The droplet sensor as claimed in claim 5, wherein the optical path change portion consists of at least one plane that refracts or reflects the extraneous light.

7. The droplet sensor as claimed in claim 5, wherein the optical path change portion has a first plane and a second plane that refract or reflect the extraneous light, and the first plane and the second plane intersect each other.

8. The droplet sensor as claimed in claim 5, wherein the optical path change portion has a first plane, a second plane, and a third plane that refract or reflect the extraneous light, and the first plane and the second plane each intersect the third plane.

9. The droplet sensor as claimed in claim 3, wherein on the optical cover, a flange that extends outward from a lower portion including the major axis.

10. A droplet sensor comprising:
    an optical cover having an ellipsoid surface that is a portion of a spheroid;
    a light source disposed at or in proximity to a first focal point of the ellipsoid surface; and
    a light detector disposed at or in proximity to a second focal point of the ellipsoid surface,
    wherein the ellipsoid surface is an effective detection area configured to reflect light emitted from the light source toward the light detector, and an amount of light reflected by the effective detection area changes in accordance with adhesion of droplets on the ellipsoid surface,
    wherein the optical cover has a curved surface that is connected to an outside of the effective detection area and having a curvature greater than a curvature of the ellipsoid surface,
    wherein a tangent to an imaginary curved surface at a boundary and a tangent to an imaginary ellipsoid surface at the boundary are the same, the imaginary curved surface being formed by extending the curved surface beyond the boundary, the imaginary ellipsoid being formed by extending the ellipsoid surface beyond the boundary, the boundary being a boundary between the curved surface and the ellipsoid surface,
    wherein in the optical cover, a first space having a sphere surface centered on the first focal point and a second space having a sphere surface centered on the second focal point are formed, and
    wherein the second space includes, at an interface with the optical cover, an optical path change portion that changes an optical path of extraneous light entering the sphere surface from outside the optical cover and traveling toward the second focal point.

11. The droplet sensor as claimed in claim 10, wherein the optical path change portion consists of at least one plane that refracts or reflects the extraneous light.

12. The droplet sensor as claimed in claim 10, wherein the optical path change portion has a first plane and a second plane that refract or reflect the extraneous light, and the first plane and the second plane intersect each other.

13. The droplet sensor as claimed in claim 10, wherein the optical path change portion has a first plane, a second plane, and a third plane that refract or reflect the extraneous light, and the first plane and the second plane each intersect the third plane.

* * * * *